US012794767B2

(12) United States Patent
Singh et al.

(10) Patent No.: US 12,794,767 B2
(45) Date of Patent: Nov. 10, 2026

(54) PREDICTIVE RISK AND PERFORMANCE RATING SYSTEM FOR NETWORK CONFIGURATIONS USING ARTIFICIAL INTELLIGENCE

(71) Applicant: AT&T Intellectual Property I, L.P., Atlanta, GA (US)

(72) Inventors: Ajay Singh, Hillsborough, NJ (US); Yuriy Malakov, Fresh Meadows, NY (US); Ayush Kumar, East Brunswick, NJ (US); Christopher Rollwage, Pilot Point, TX (US); Michael Kaiser, Denton, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 86 days.

(21) Appl. No.: 18/901,791

(22) Filed: Sep. 30, 2024

(65) Prior Publication Data

US 2026/0095372 A1 Apr. 2, 2026

(51) Int. Cl.

*H04L 41/0853* (2022.01)
*H04L 41/08* (2022.01)
*H04L 41/147* (2022.01)
*H04L 41/16* (2022.01)

(52) U.S. Cl.

CPC ............ *H04L 41/08* (2013.01); *H04L 41/147* (2013.01); *H04L 41/16* (2013.01)

(58) Field of Classification Search

CPC ........ H04L 41/08; H04L 41/147; H04L 41/16
See application file for complete search history.

(56) References Cited

U.S. PATENT DOCUMENTS

| | | | | |
|---|---|---|---|---|
| 10,637,884 B2 * | 4/2020 | Apple | H04L 63/1416 |
| 11,470,106 B1 * | 10/2022 | Lin | H04L 63/1433 |
| 11,552,974 B1 * | 1/2023 | Bagga | H04L 65/61 |
| 11,556,815 B1 * | 1/2023 | Stave | G06N 5/04 |
| 11,757,907 B1 * | 9/2023 | Berger | G06N 7/01 726/23 |
| 2014/0137257 A1 * | 5/2014 | Martinez | H04L 63/1433 726/25 |
| 2019/0089725 A1 * | 3/2019 | Anachi | G06N 20/00 |
| 2020/0067935 A1 * | 2/2020 | Carnes, III | G06N 3/0442 |
| 2020/0159888 A1 * | 5/2020 | Ghose | G06F 12/0842 |
| 2020/0314134 A1 * | 10/2020 | Izrael | H04L 63/1433 |

(Continued)

*Primary Examiner* — Chris Parry
*Assistant Examiner* — Hassan Abdur-Rahman Khan
(74) *Attorney, Agent, or Firm* — Guntin & Gust, PLC; Andrew Gust

(57) ABSTRACT

Aspects of the subject disclosure may include, for example, generating network configuration data for a network device according to device information of a vendor; providing the network configuration data to an Artificial Intelligence (AI) analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

20 Claims, 7 Drawing Sheets

(56) References Cited

U.S. PATENT DOCUMENTS

| | | | | |
|---|---|---|---|---|
| 2020/0351284 | A1* | 11/2020 | Davis | H04L 63/1425 |
| 2020/0382538 | A1* | 12/2020 | Feezell | H04L 63/1433 |
| 2021/0021629 | A1* | 1/2021 | Dani | H04L 63/1433 |
| 2021/0037038 | A1* | 2/2021 | Alsharif | G06F 17/16 |
| 2021/0081189 | A1* | 3/2021 | Nucci | G06F 16/252 |
| 2022/0014554 | A1* | 1/2022 | Vasu | G06N 3/045 |
| 2022/0131887 | A1* | 4/2022 | Ngweta | H04L 63/1433 |
| 2022/0309155 | A1* | 9/2022 | Payne | G06F 16/9024 |
| 2022/0360602 | A1* | 11/2022 | Rose | G06N 20/00 |
| 2022/0377093 | A1* | 11/2022 | Crabtree | H04L 43/045 |
| 2022/0377100 | A1* | 11/2022 | Xiao | H04L 63/1433 |
| 2022/0400131 | A1* | 12/2022 | Shao | G06F 21/577 |
| 2023/0370491 | A1* | 11/2023 | Crabtree | H04L 63/102 |

* cited by examiner

200

300

600

PREDICTIVE RISK AND PERFORMANCE RATING SYSTEM FOR NETWORK CONFIGURATIONS USING ARTIFICIAL INTELLIGENCE

FIELD OF THE DISCLOSURE

The subject disclosure relates to a predictive risk and performance rating system for network configurations using artificial intelligence.

BACKGROUND

Configuration management of a network presents significant challenges due to the complexity. A multi-vendor and multi-domain architecture necessitates meticulous configuration of each device with accurate data and commands. This process demands substantial time and testing, and the repercussions of incorrect configurations may not surface immediately. Manual oversight, extensive testing, and individual expertise are required, yet issues with network connectivity and occasional disconnections persist. The scalability of this process becomes a concern as the demand for enhanced connectivity increases.

Traditional methods rely heavily on test and lab environments that do not accurately reflect actual production settings. These methods involve simple health checks and require manual supervision, often resulting in a reactive approach. This can lead to increased time and financial costs, negatively impacting operations. The absence of predictive capabilities in current methodologies means potential risks and future failures often go unnoticed until they escalate into significant issues, hindering proactive network management. Rapidly advancing nature of network technologies requires continuous learning and adaptation, which current tools and systems fail to support adequately.

BRIEF DESCRIPTION OF THE DRAWINGS

Reference will now be made to the accompanying drawings, which are not necessarily drawn to scale, and wherein.

DETAILED DESCRIPTION

Figure 1:
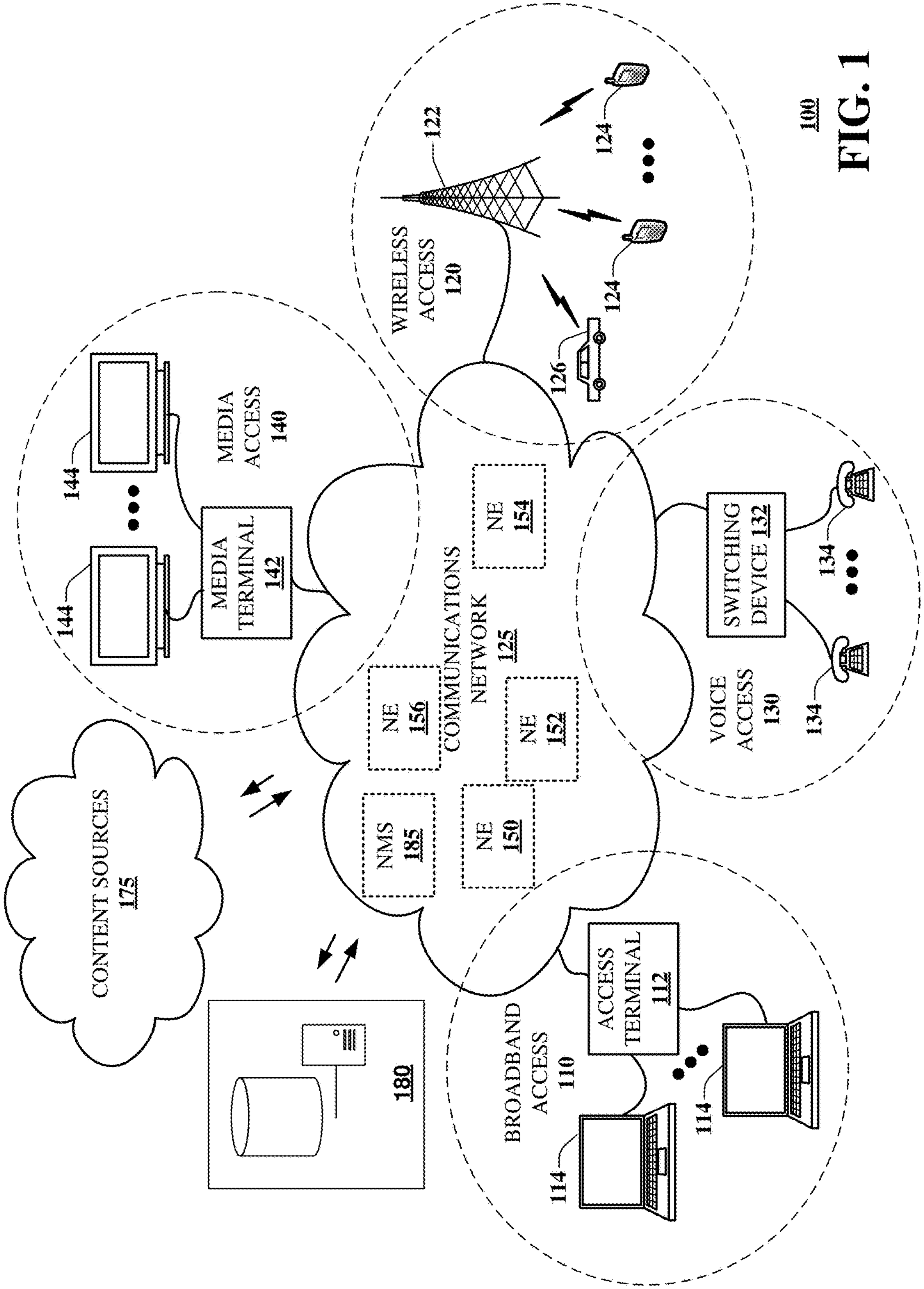
FIG. 1 is a block diagram illustrating an exemplary, non-limiting embodiment of a communications network in accordance with various aspects described herein.

The subject disclosure describes, among other things, illustrative embodiments for applying an Artificial Intelligence (AI) model to network configuration data (e.g., for a single network device, multiple network devices, a portion of a network device, or any other equipment) resulting in a configuration analysis. The configuration analysis can take into account (e.g., as an input to the AI model) various information including topology data, historical network metrics, device specifications, etc. In one or more embodiments, the configuration analysis can evaluate the network configuration data to generate responsive information such as rating information (e.g., security, risk, efficiency, etc.) and/or adjustment information that includes a recommendation for changing at least a portion of the network configuration data for the network device(s). In one or more embodiments, the AI analysis can be an iterative process with network configurations, rating information, and configuration recommendations being exchanged between a Network Configuration Management (NCM) system and an AI platform to arrive at acceptable network configurations and acceptable ratings. This iterative process can include the NCM partially adopting recommended configurations and re-submitting the adjusted configuration to the AI platform for evaluation. Other embodiments are described in the subject disclosure.

One or more of the exemplary embodiments provide an integration of Natural Language Processing (NLP) and AI/ML to analyze, evaluate, and improve/optimize network device configurations and their topology/relationship. In one or more embodiments, this can be done in real-time. As an example, one or more of the exemplary embodiments can interpret the intent behind configuration commands, such as mimicking or even improving upon the analytical capabilities of a human expert. One or more of the exemplary embodiments can predict potential future risks and/or performance issues before they manifest.

In one or more embodiments, the system and methodology can provide a comprehensive, multidimensional rating for each configuration file, encompassing risk, impact, and/or future failure predictions. This level of insight and actionability is not provided by contemporary network configuration management systems. The system's ability to automate intricate analyses and provide clear, actionable guidance for network optimization significantly can enhance network performance and security while streamlining the workload of network administrators.

In one or more embodiments, various components or functionality, such as a configuration parsing engine, rule analysis engine, AI/ML analysis engine, and reporting and recommendations generator, can work together to effectively provide predictive insights, automated risk assessments, and actionable optimization/improvement recommendations, including where multiple network devices are being introduced or adjusted within the network via particular network configurations of the devices. This holistic approach can address and solve scalability challenges in a network configuration process (e.g., a fiber network).

One or more aspects of the subject disclosure include a method comprising receiving, by a processing system including a processor, network configuration data for a network device from a NCM system. The method can include receiving, by the processing system, topology data for a network in which the network device is or will be operating. The method can include applying, by the processing system, an AI model to the network configuration data based at least in part on the topology data resulting in a configuration analysis, where the configuration analysis evaluates a security rating, a risk rating, and an efficiency rating for the network configuration data. The method can include providing, by the processing system, rating information according to the security rating, the risk rating, and the efficiency rating for the network configuration data.

One or more aspects of the subject disclosure include a device, comprising a processing system including a processor; and a memory that stores executable instructions that, when executed by the processing system, facilitate performance of operations. The operations can include providing network configuration data for a network device to an AI analysis platform that applies an AI model to the network configuration data based at least in part on topology data resulting in a configuration analysis, where the configuration analysis evaluates a security rating, a risk rating, and an efficiency rating for the network configuration data. The operations can include receiving rating information according to the security rating, the risk rating, and the efficiency rating for the network configuration data.

One or more aspects of the subject disclosure include a non-transitory machine-readable medium, comprising executable instructions that, when executed by a processing system including a processor, facilitate performance of operations. The operations can include generating network configuration data for a network device according to device information of a vendor. The operations can include providing the network configuration data to an AI analysis platform that applies an AI model to the network configuration data based at least in part on topology data resulting in a configuration analysis, where the configuration analysis evaluates the network configuration data and generates adjustment information that includes a recommendation for changing at least a portion of the network configuration data for the network device. The operations can include receiving the adjustment information from the AI platform.

Referring now to FIG. 1, a block diagram is shown illustrating an example, non-limiting embodiment of a system 100 in accordance with various aspects described herein. In one or more embodiments, an AI Platform 180 (e.g., hardware and/or software that can perform various AI/ML functionality which can include applying models to analyze information). As an example, the AI platform 180 can be operated in a centralized or distributed fashion, including being executed by one or more servers (e.g., in the network core, in edge servers, or located elsewhere), executed in the cloud, applied via virtual functionality (e.g., virtual machines), or otherwise implemented by a service provider or an entity providing this evaluation service.

In one or more embodiments, a system and methodology can provide predictive risk and performance ratings for network configurations, such as a fiber network, through various AI and ML techniques employed by the AI platform 180. The platform 180 can address the complexities and challenges associated with configuring network devices within a multi-vendor and multi-domain architecture where different vendors may be (and typically are) utilizing different device operating systems, different configurations, and so forth.

In one or more embodiments, a system and methodology can provide NLP to analyze, evaluate, and optimize network device configurations and their topologies in real-time. In one or more embodiments, a system and methodology can overcome difficulties of traditional methods of network configuration management which are time-intensive and prone to errors.

In one or more embodiments, a system and methodology can avoid heavy reliance on time-consuming techniques including test/lab environments that may not accurately reflect actual production network, leading to potential risks and inefficiencies. In one or more embodiments, a system and methodology can provide predictive capabilities in methodologies so that potential risks and future failures do not go unnoticed.

In one or more embodiments, a system and methodology can provide an automated analysis and optimization/improvement of network configurations by interpreting an intent behind configuration commands, which can include predicting or foreseeing potential future risks and performance issues before they manifest.

In one or more embodiments, the system 100 can include a configuration management component/functionality that can generate an initial network configuration file for network devices within a multi-vendor and multi-domain architecture so as to ensure that the configuration adheres to predefined network standards. In one or more embodiments, the system 200 can include an integration component/functionality which interfaces with an AI sub-system that employs NLP and AI/ML to analyze and evaluate the initial network configuration file and its associated topologies in real-time.

In one or more embodiments, the system 100 can include a configuration parsing engine that parses the generated configuration data and commands, detecting any syntax errors and ensuring the data is correctly formatted. In one or more embodiments, the system 100 can include a rule analysis engine that evaluates the parsed configurations against a set of predefined rules or policies to identify discrepancies, potential conflicts, and/or deviations, and it can prioritize these discrepancies based on their potential impact on network performance and security. In one or more embodiments, the system 100 can include an AI/ML analysis engine which applies machine learning algorithms to evaluated configurations to predict the impact of configuration changes, identifying patterns or anomalies, and learning from historical data. In one or more embodiments, the system 100 can utilize a neural network model trained on historical network configuration data.

In one or more embodiments, the system 100 can include a reporting and recommendations generator that provides a comprehensive, multidimensional rating for the initial (or subsequently adjusted/modified) configuration file, encompassing risk, impact, and/or future failure predictions. For example, it can provide real-time insights and actionable recommendations for network optimization, which are displayed on a visual dashboard for network administrators or other users. In one or more embodiments, the system 100 can include an adjustment component/functionality which can iteratively adjust the initial network configuration file according to recommendations provided via application of AI models, which can include simulating the impact of the recommended adjustments before applying them to the network configuration file.

In one or more embodiments, the system 100 can include a re-evaluation component/functionality which re-evaluates the adjusted network configuration file using NLP and AI/ML techniques to ensure compliance with predefined rules and to predict potential impacts. The iterative adjustment and re-evaluation process can continue until the network configuration file meets the desired performance and risk criteria.

In one or more embodiments, the system 100 can include historical dataset storage which stores historical data regarding past configurations, performance metrics, and/or outcomes of previous modifications/optimizations. For instance, this data can be used by the AI/ML analysis engine to improve its predictive capabilities over time. In one or more embodiments, the system 100 can include a network topology dataset storage, which maintains detailed information about the network's structure, including device interconnections and hierarchical relationships. In one or more embodiments, the system 100 can include an API exposure component/functionality which exposes APIs for integration with other systems to facilitate the automation and real-time analysis of network configurations.

In one or more embodiments, the AI platform 180 can evolve and learn from its own implementation and analysis, including based on feedback and grading (e.g., by humans and/or by AI tools) of how well its ratings and/or recommendations performed. For example, in one or more embodiments, the AI platform 180 can perform fine-tuning of a Large Language Model (LLM) to enhance a Natural Language Model (NLM) by leveraging pre-trained capabilities of the LLM and adapting it to specific tasks or domains. As an example, platform 180 can perform one or more of: defining the specific task or domain for which the NLM needs to be fine-tuned which can include sentiment analysis, machine translation, and/or question answering; gathering a large and diverse dataset relevant to the target task or domain which can be preprocessed to remove noise, handle missing values, and ensuring consistency; selecting a pre-trained LLM that serves as a base model; tokenizing text data using the same tokenizer that was used to train the pre-trained LLM to ensure consistency in how the text is represented as input to the model; fine-tuning by training the pre-trained LLM on the task-specific dataset which can include adjusting the model's weights to better align with the target task; evaluating the model's performance on a test set that was not used during training to obtain an unbiased assessment of the model's capabilities; and/or hyperparameter tuning by experimenting with different hyperparameters to find the optimal settings that yield the best performance including adjusting learning rate, batch size, or other parameters.

In one or more embodiments, the system 100 can include a Network Configuration Management (NCM) system 185 which can perform functions including managing and maintaining the configurations of network devices (which can be any type of device that facilitates operations or other functionality of the communication network and/or that is configurable including routers, optical units, etc.). In one or more embodiments, the NCM system 185 can manage the configurations of all network devices, including routers, switches, firewalls, and other network elements, to ensure that configurations are consistent, compliant with policies, and optimized/improved for performance. In one or more embodiments, the NCM system 185 can automate the deployment of configuration changes across the network, which can reduce the risk of human error, speed up the deployment process, and ensure that all devices are configured uniformly or for interoperability.

In one or more embodiments, the NCM system 185 can regularly back up the configurations of network devices. In case of a device failure or misconfiguration, the system 100 can quickly restore the device to its last known good configuration or a default setting, minimizing downtime and service disruption. In one or more embodiments, the NCM system 185 can provide for compliance and auditing, such as ensuring that network configurations comply with industry standards, regulatory requirements, and internal policies. It provides auditing capabilities to track configuration changes, identify non-compliant configurations, and generate compliance reports. In one or more embodiments, the NCM system 185 can manage the process of making configuration changes, including planning, approval, implementation, and documentation. It ensures that changes are made in a controlled and systematic manner, reducing the risk of network disruptions. In one or more embodiments, the NCM system 185 can continuously monitor the network for configuration changes, performance issues, and security vulnerabilities. It generates reports and alerts to inform network administrators or other users of any issues that need attention.

In one or more embodiments, the NCM system 185 can maintain a history of configuration versions for each network device. This allows administrators to track changes over time, compare different versions, and roll back to previous configurations if needed. In one or more embodiments, the NCM system 185 can assist in securing the network by enforcing security policies, detecting unauthorized configuration changes, and ensuring that devices are configured with the latest security settings and patches. In one or more embodiments, the NCM system 185 can integrate with other network management and orchestration tools, such as Network Management Systems (NMS), Software-Defined Networking (SDN) controllers, and AI/ML-based analytics platforms. This integration enhances the overall network management capabilities and enables more efficient and intelligent network operations.

In one or more embodiments, system 100 through use of the AI platform 180, the NCM system 185 and/or other functionality or components, can perform steps that involve automated and/or manual processes to ensure that each network device is correctly configured to support the high-speed, low-latency, and high-capacity requirements, such as in a 5G or NG network. In one or more embodiments, the NCM system 185 can facilitate creation of configuration templates, such as based on the network design. These templates can include standard settings and parameters for various types of network devices, such as base stations (gNodeBs), routers, and switches. Templates ensure consistency and compliance with network policies and standards.

In one or more embodiments, the NCM system 185 can provide for device-specific adjustments such as based on their location, role, and the specific requirements of the area they serve. For example, a base station in a densely populated urban area may have different configuration settings compared to one in a rural area.

In one or more embodiments, the NCM system 185 can leverage automation and orchestration tools to streamline the configuration process. For instance, these tools can use APIs and software-defined networking (SDN) principles to automatically generate and apply configurations to network devices. Automation can reduce the risk of human error and speed up the deployment process.

In one or more embodiments, the NCM system 185 interfaces with the AI platform 180 to analyze and optimize configurations, including predicting the impact of configuration changes, identifying potential risks, and providing recommendations for optimization. This ensures that the configurations not only meet current requirements but are also future-proofed against potential issues.

In one or more embodiments, the NCM system 185 can facilitate testing and validation such as in a controlled environment. This step ensures that the configurations work as intended and do not introduce any vulnerabilities or performance issues.

In one or more embodiments, the NCM system 185 can facilitate deployment of the configurations to the network devices. For example, this can be done remotely using network management systems (NMS) and orchestration tools. In some cases, on-site technicians can apply configurations manually.

In one or more embodiments, the NCM system 185 can facilitate continuous monitoring to ensure the network devices operate correctly. For example, performance data can be collected and analyzed to identify any issues or areas for improvement. The AI/ML system can provide ongoing recommendations for optimization based on real-time data.

For example, system 100 can facilitate in whole or in part generating network configuration data for a network device according to device information of a vendor; providing the network configuration data to an AI analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
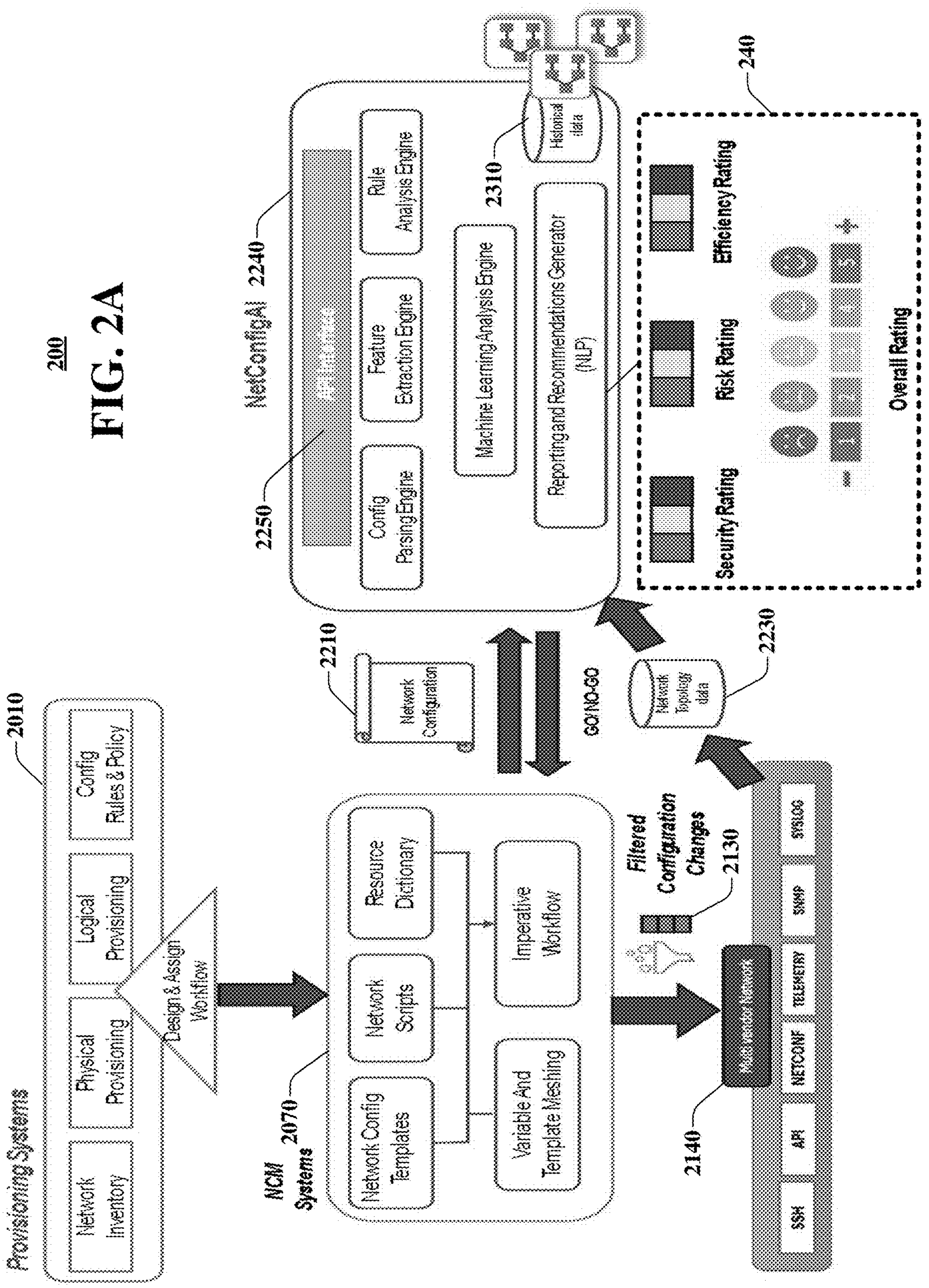
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. FIG. 2A shows a system 200 which can evaluate network configurations (including in real-time, near-real-time or other timing) for any type or number of network devices, which can include predictive risk and performance rating. The network being evaluated can be of various types and can include various architecture, components, functionality, and so forth, and can include 5G or next generation networks and/or can include fiber networks.

The system 200 can include or interface with provisioning system(s) 2010, which can be of various types of systems/sub-systems/functionality including network inventory, physical provisioning, logical provisioning, Configuration Rules and Policy (CRP), Design and Assign Workflow (DAW) and other systems/sub-systems/functionality that facilitate or enable provisioning of a communications network. All or a portion of the provisioning systems 2010 can be operated by the service provider managing the network and/or third parties that provide service/hardware/software/functionality to the service provider.

Provisioning Systems 2010 include or interface with network inventory, physical provisioning, logical provisioning, and CRP to facilitate network configuration management. For example, these components can interact through DAW to manage the initial and subsequent setup and configuration of network devices. For instance, network inventory can maintain a comprehensive list of some or all network devices and their attributes. In another example, physical provisioning can be involved in the physical setup and connections of network devices. Logical provisioning can manage the logical configuration and settings of the network devices. CRP can ensure that all configurations adhere to predefined rules and policies, such as of the Service Provider (including QoS requirements, Service Level Agreements (SLAs), and so forth), 3GPP, regulatory requirements, and so forth. DAW can coordinate, provide or otherwise facilitate the design and/or assignment of network configurations, feeding into NCM Systems 2070.

The NCM system(s) 2070 can include various types of systems/sub-systems/functionality including network configuration templates, network scripts, resource dictionary, Variable and Template Meshing (VATM), workflow/imperative workflow, and/or other systems/sub-systems/functionality which can facilitate receiving and generating network configurations for various network devices (in whole or in part).

As an example, the network configuration templates can provide standardized templates for network configurations. For instance, these can be pre-defined and stored based on information obtained from a vendor of the particular network device and/or based on other information including historical data that results in a recommendation to a change to an initial configuration for a template, which may or may not be different from an initial recommended configuration supplied by the vendor of the device. In one embodiment as described herein, the AI platform 2240 can evaluate a network configuration received from the NCM system 2070 and can provide ratings and recommendation information back to the NCM system. In one embodiment, this information can be utilized for adjusting configuration information in the network configuration templates which, in some cases, can result in a different template configuration as compared to an initial recommended configuration supplied by the vendor of the device.

As another example, workflow/imperative workflow can manage the execution of configuration tasks. In one embodiment, the workflows can be prioritized based on various factors, including types of network devices that are being configured or reconfigured. As another example, network scripts can be utilized which automate or otherwise facilitate the application of these configurations. As another example, a resource dictionary can maintain a repository of configuration parameters and their definitions.

As another example, VATM can combine variables and templates to create customized configurations. For example, the VATM can take predefined configuration templates and combine them with specific variables to create customized configuration files for network devices where the templates provide a standardized structure, while variables allow for customization based on the specific requirements of each device or network segment. By using templates, VATM can ensure that some or all configurations adhere to a consistent format and comply with network policies and standards, resulting in maintaining network reliability and performance. The VATM can automate the process of generating configuration files, reducing the need for manual intervention, which can speed up the deployment process and minimizes the risk of human error. As networks grow and evolve, the VATM enables the NCM system to scale efficiently. It can quickly generate configuration files for a large number of devices, making it easier to manage complex, multi-vendor, and multi-domain network environments. The VATM allows for flexibility in network configuration by enabling the use of different variables for different scenarios. For example, it can generate different configurations for devices in urban versus rural areas, or for different types of services (e.g., residential vs. business customers). The VATM can work in conjunction with other components of the NCM system 2070 to ensure that the generated configurations are not only customized but also optimized/improved for performance, security, and compliance.

The network configurations can be applied (in whole or in part) to any number/type of configurable components/devices/functionality of a communications network 2140, which is illustrated in a non-limiting example as a multi-vendor network. For example, the multi-vendor network 2140 can include network devices that are supplied by different vendors. These different types of network devices may operate utilizing different operating systems, software, commands, parameters, characteristics or other distinctions which utilize specific network configurations. In other examples, the multi-vendor network 2140 can include one or more network devices that are managed or operated by different entities, which can include third parties that are different from the service provider providing the network communication service. For purposes of illustration and simplification, the multi-vendor network 2140 shows some components/devices/functionality including Secure Shell, API, NETCONF, Telemetry, SNMP, and/or SYSLOG, however, other components/devices/functionality, which can be implemented in various architectures can also be used for providing communication services, including voice, video, data, and messaging.

For example, a Secure Shell (SSH) can provide a secure method for remote access and management of network devices by encrypting communication between the client and the server, ensuring that data transmitted over the network is protected from eavesdropping and tampering. The SSH can be used in various ways including for executing commands, transferring files, and managing configurations on network devices securely. As another example, an Application Programming Interface (API) can allow different software components and systems to communicate with each other, including between the NCM system 2070 and the network 2140. As another example, a Network Configuration Protocol (NETCONF) can be utilized which includes a protocol used for managing network device configurations. For instance, it can provide mechanisms to install, manipulate, and/or delete the configuration of network devices. NETCONF can use XML-based data encoding for configuration data and protocol messages, allowing for efficient and standardized communication between the NCM system and network devices.

As another example, telemetry can be employed which involves the collection and transmission of real-time data from network devices to a central and/or distributed system for monitoring and analysis. Telemetry data can be of various types including performance metrics, status updates, and other operational information, which in one or more embodiments can be used to continuously monitor the network's health, detect anomalies, and provide insights for optimizing or improving network performance and security. As another example, Simple Network Management Protocol (SNMP) can be applied which is a protocol for network management that allows the NCM system 2070 to collect information about network devices, such as their status, performance, and configuration. SNMP can also enable the NCM system 2070 or other devices/functionality to send commands to network devices to change their configurations or perform specific actions. SNMP can be used for monitoring and managing large-scale network environments. As another example, Syslog can be utilized which includes a protocol for logging system messages and events from network devices. It provides a centralized way to collect and store log data, which can be used for troubleshooting, auditing, and security analysis. For example, Syslog can facilitate tracking configuration changes, detecting security incidents, and/or maintaining a historical record of network events. These various components/devices/functionality can facilitate secure, efficient, and standardized communication and management of network devices, enabling real-time/near-real-time/other-time monitoring, configuration, and optimization of the network 2140.

In one or more embodiments, the network configuration 2210 can be an output of NCM Systems 2070 as described herein based on various information and techniques including network configuration templates, vendor specifications and equipment descriptions, service provider rules and policies, device location and network topology, and/or other information. The network configuration 2210 can then be provided to the AI platform 2240 (e.g., via an API 2250) for evaluation, which can be performed utilizing various techniques including AI/ML modeling, which can be based on various information including network conditions (e.g., past, present and/or predicted), network metrics, network topology, quality of service policies, etc., and/or which can be according to various criteria including security, risk, efficiency, and so forth.

In one or more embodiments, multiple potential network configurations 2210 for a same network device or different network devices can be provided for evaluation (which can be separately evaluated or can be evaluated together (e.g., determining ratings and predicted network conditions if the multiple network devices were simultaneously introduced into the network)). In another embodiment, the evaluation can be based on a network configuration that is being proposed for a same network device that is used throughout the network (such as thousands of the network device that would be reconfigured), which may have a different effect on the network than if only one of the network devices were reconfigured.

The AI platform 2240 (illustrated as NetConfigAI in FIG. 2A) can include various types of systems/sub-systems/functionality including API 2250, a Configuration Parsing Engine (CPE), a Feature Extraction Engine (FEE), a Rule Analysis Engine (RAE), an AI/ML Analysis Engine (AIMLAE), Reporting and Recommendations Generator (e.g., which can provide natural language processing), a historical database 2310 and/or other systems/sub-systems/functionality which can apply AI modeling to the network configuration 2210 to generate an evaluation and analysis. As an example, these components can analyze and optimize/improve network configurations, such as for individual devices, groups of devices, and/or portions of devices, using advanced AI and ML techniques. As an example, the API 2250 can facilitate communication between the AI platform 2240 and other systems including NCM systems 2070, network 2140, public databases, private databases, third party performance evaluation platforms, and so forth.

As another example, CPE can parse the configuration data of network configuration 2210. As another example, FEE can extract or otherwise determine relevant features from the parsed data. As another example, RAE can evaluate the data against predefined rules and policies, which can be of various types including performance-based, cost-based, quality-based, and/or security-based. As another example, network topology data 2230 can be accessed to provide detailed information about the network's structure and topology. Other databases can also be accessed to facilitate applying one or more AI models to the network configuration(s) for evaluation, including network performance data (e.g., past, present and/or predicted). As another example, MLAE can apply one or more AI models or other AI/ML algorithms to evaluate the network configuration 2210, which can include predicting the impact of configuration changes. As another example, RARGN can generate reports, alerts, notifications, ratings, and/or recommendations for the evaluated network configuration. In one embodiment, the AI modeling can include or be based on natural language processing.

Historical database 2310 can store past configurations and performance metrics (or other historical data that can be used by an AI model). In one embodiment, a Security Rating, a Risk Rating, and an Efficiency Rating can provide multidimensional assessments of the configurations, while an Overall Rating can combine these ratings to give a comprehensive evaluation of the network configuration.

In one or more embodiments, such as after a one-time or iterative evaluation of the network configuration(s) by the AI platform 2240, Filtered Configuration Changes (FCC) 2130 can be provided to and implemented by the network 2140, such as at designated network devices.

In one or more embodiments, the APIs of system 200 enable or otherwise facilitate the integration of the NCM system 2070, the AI platform 2240, and the provisioning systems 2010 with other network management tools, AI/ML systems, and/or external applications. APIs can facilitate the automation of configuration tasks, retrieval of network data, and implementation of ratings and/or recommendations provided by the AI platform 2240.

The AI platform 2240, through its evaluation of the network configuration 2210, can provide responsive information 240 which can include ratings for the proposed network configuration (e.g., security rating, risk rating, efficiency rating, and/or overall rating). In other embodiments, the information 240 can include recommendations for changing some or all of the network configuration 2210. In one embodiment, the recommendation can include descriptions as to pros and cons with respect to the network configuration 2210, portions of the network configuration, the recommended configuration and/or portions of the recommended configuration. In one embodiment, the AI platform 2240 can provide a GO/NO GO response to the evaluated network configuration 2210. In one embodiment, the response information 240 can include predictions associated with the network configuration and/or the recommended configuration, including performance metrics, time frames, maintenance requirements, resource usage, and so forth. In other embodiments, the predictions can be based on other potential adjustments that are being made or could be made to the network 2140, such as changing the network configuration of a second network device around the same time (e.g., a connected or related device).

In one or more embodiments, a filtered/evaluated/adjusted configuration 2130 includes a filtered and refined version of the network configuration (or changes thereto) for one or more network devices or portions thereof, which may have gone through an iterative process including multiple configuration changes based on AI modeling applied via AI platform 2240.

Figure 2B:
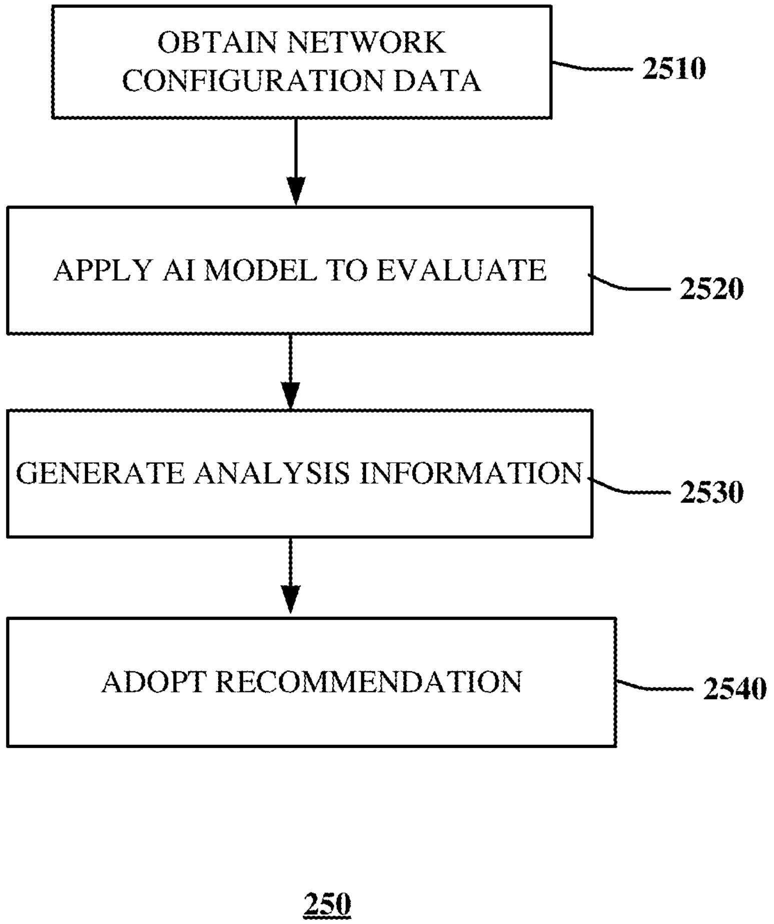
FIG. 2B depicts an illustrative embodiment of a method in accordance with various aspects described herein.

FIG. 2B depicts an illustrative embodiment of a method 250 in accordance with various aspects described herein. At 2510, network configuration data for a network device(s) can be obtained. For example, the data can be an initial configuration that is derived from information from a vendor, configuration templates such as utilized by the service provider in the past for this particular device, and so forth.

At 2520, the network configuration data can be evaluated through use of an AI model. For example, the AI model can be a model that is specifically trained to evaluate network configurations. In another embodiment, the AI model can be fine-tuned to provide a higher degree of accuracy and efficiency, such as fine-tuning the AI model based on information specific to the service provider's network and configurations, which may be public and/or private information. In one embodiment, various other information is utilized for the configuration analysis and inputted into or otherwise utilized by the AI model, such as topology data.

At 2530, the analysis can be applied via the AI model for determining or otherwise generating various information, such as security, risk and efficiency assessments or ratings. In one embodiment, the ratings can be on a scale (e.g., numerical), color-coded, or otherwise presented to facilitate understanding by a user of the particular rating that is being conveyed by the AI platform. In other embodiments, the evaluation can be performed to optimize or improve the configuration of the data, particularly in light of the topology and neighboring devices, which can include generating recommendations as to changes that should be made to the configuration of the network device(s) or to other network devices that are interfacing or interacting with this particular network device.

In one embodiment, the configuration analysis evaluates the network configuration data and generates adjustment information that includes a recommendation for changing at least a portion of the network configuration data for the network device, which at 2540 can be adopted in whole or in part by the NCM system. In one embodiment, the NCM system can generate partially adjusted network configuration data for the network device, where the partially adjusted network configuration data partially adopts the recommendation for changing the at least a portion of the network configuration data for the network device. In one embodiment, the NCM system can provide the partially adjusted network configuration data to the AI platform for further evaluation according to the AI model.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, a Predictive Risk and Performance Rating System and methodology are provided for communications networks, such as fiber network configurations, using AI to address multifaceted challenges. By leveraging AI to automate and enhance the analysis and optimization of network configurations, the system and methodology not only bolsters network performance and security but also significantly streamlines the workload of network engineers and operations teams. As an example, the system and methodology can provide predictive insights, automated risk assessments, and actionable optimization recommendations. In one embodiment, Natural Language Processing (NLP) and AI/ML models can be utilized to automate the analysis, evaluation, and optimization of network device configurations. In one embodiment, the AI platform can predict the impact of configuration changes, identify patterns or anomalies that might indicate issues, and even learn from historical data to improve its predictive capabilities over time. In one or more embodiments, deployment or use of filtered network configuration per the process described herein can be subject to particular authorization and safeguards, including requiring approval of a human. In one or more embodiments, response information including ratings and/or recommendations can be provided at a dashboard that is accessible to the NCM system or other user equipment of the service provider for viewing by various users.

A non-limiting example of a security rating in ratings information that can be generated as a result of an AI evaluation of a network configuration for a network device is as follows:

Security Rating: 3/5

- Pros:
  - Use of encrypted passwords enhances security against unauthorized access.
  - Configuration of management access with a password and the option for SSH suggests a consideration for secure remote management.
- Cons:
  - Telnet is enabled for remote management, which is not secure as it sends data, including passwords, in plaintext. SSH should be the exclusive protocol for secure communications.
  - The specific details of the encryption method for passwords were not provided, making it difficult to evaluate the strength of the encryption.

A non-limiting example of a risk rating in ratings information that can be generated as a result of an AI evaluation of a network configuration for a network device is as follows:

Risk Rating: 3/5

- Pros:
  - Implementation of LAG for redundant links to the BNG reduces the risk of a single point of failure, ensuring higher availability.
  - Use of standby configurations for interfaces provides IP redundancy, further reducing downtime risks.
- Cons:
  - The configuration includes several services and features (e.g., logging, QoS) that, if not properly maintained, could potentially be exploited or lead to unintended service degradation.
  - No explicit mention of access control lists (ACLs) or other filtering mechanisms to limit access to the device, potentially exposing it to unauthorized access or attacks A non-limiting example of an efficiency rating in ratings information that can be generated as a result of an AI evaluation of a network configuration for a network device is as follows:

Efficiency Rating: 3/5

- Pros:
  - Efficient use of bandwidth through QoS policies ensures that critical traffic is prioritized, optimizing network performance.
  - The configuration of VLANs for segmenting residential and business customers can improve network organization and traffic management.
- Cons:
  - While LAG improves redundancy and bandwidth utilization, it also requires additional management and monitoring to maintain efficiency.
  - The configuration's efficiency could be impacted if the standby and preempt settings are not finely tuned for the network's specific failover requirements.

The types of network configurations can vary, such as based on the type of network device (e.g., an EMUX device). As a non-limiting example, network configurations can include one or more of hostname, password encryption, IP domain-lookup, timestamping, interface descriptions, shutdown on/off, speed, duplex full, flow control receive/send, channel-group mode active, switchport trunk, IP address, IP helper-address, QoS settings, policy-map, traffic class, bandwidth percent, fair-queue, standby configuration, logging configuration, and/or management access configuration. Other configurable parameters for a network device or a portion thereof can also be managed by the system and methodology described herein.

Figure 3:
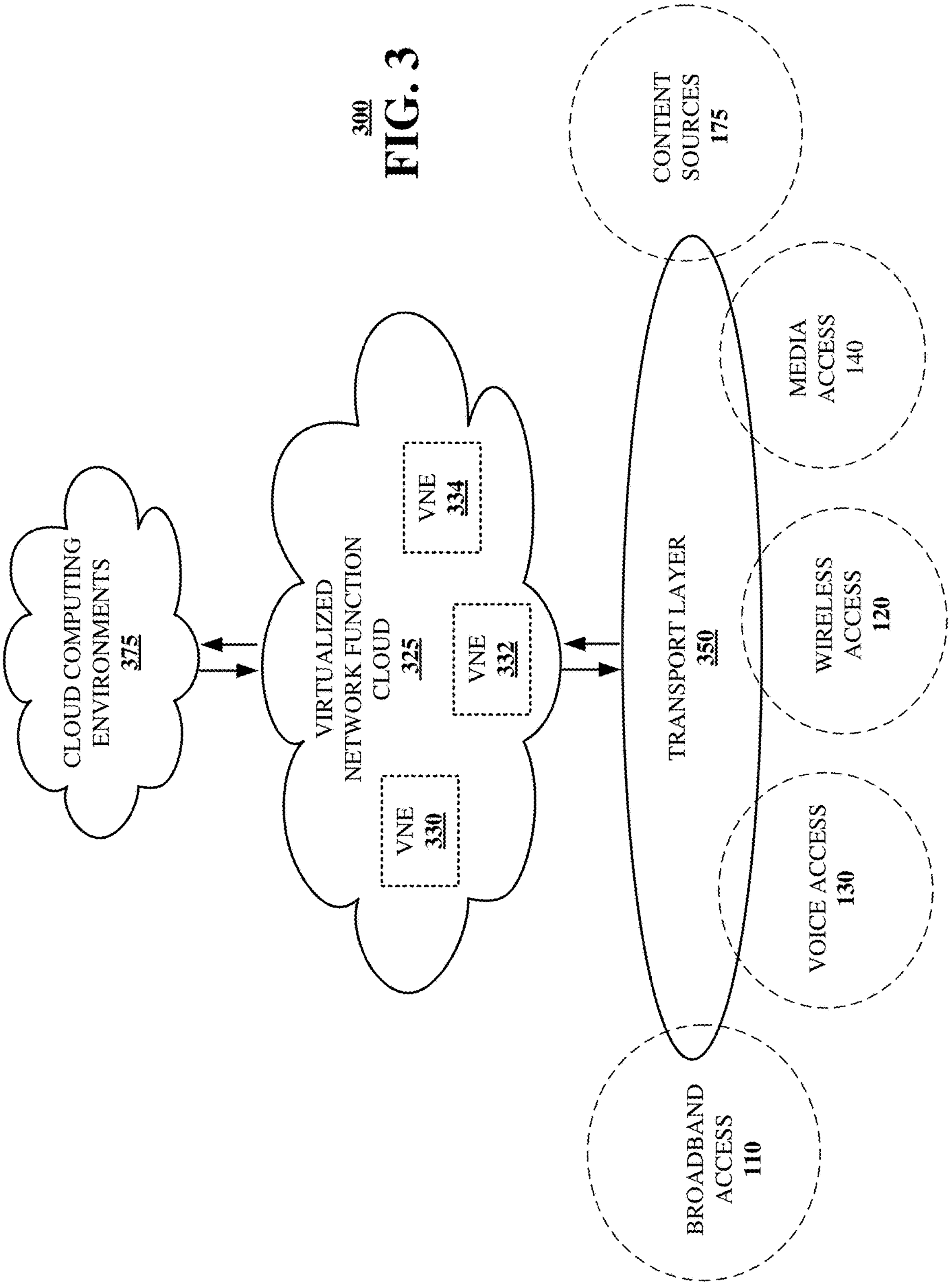
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, and 3. For example, virtualized communication network 300 can facilitate in whole or in part generating network configuration data for a network device according to device information of a vendor; providing the network configuration data to an AI analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
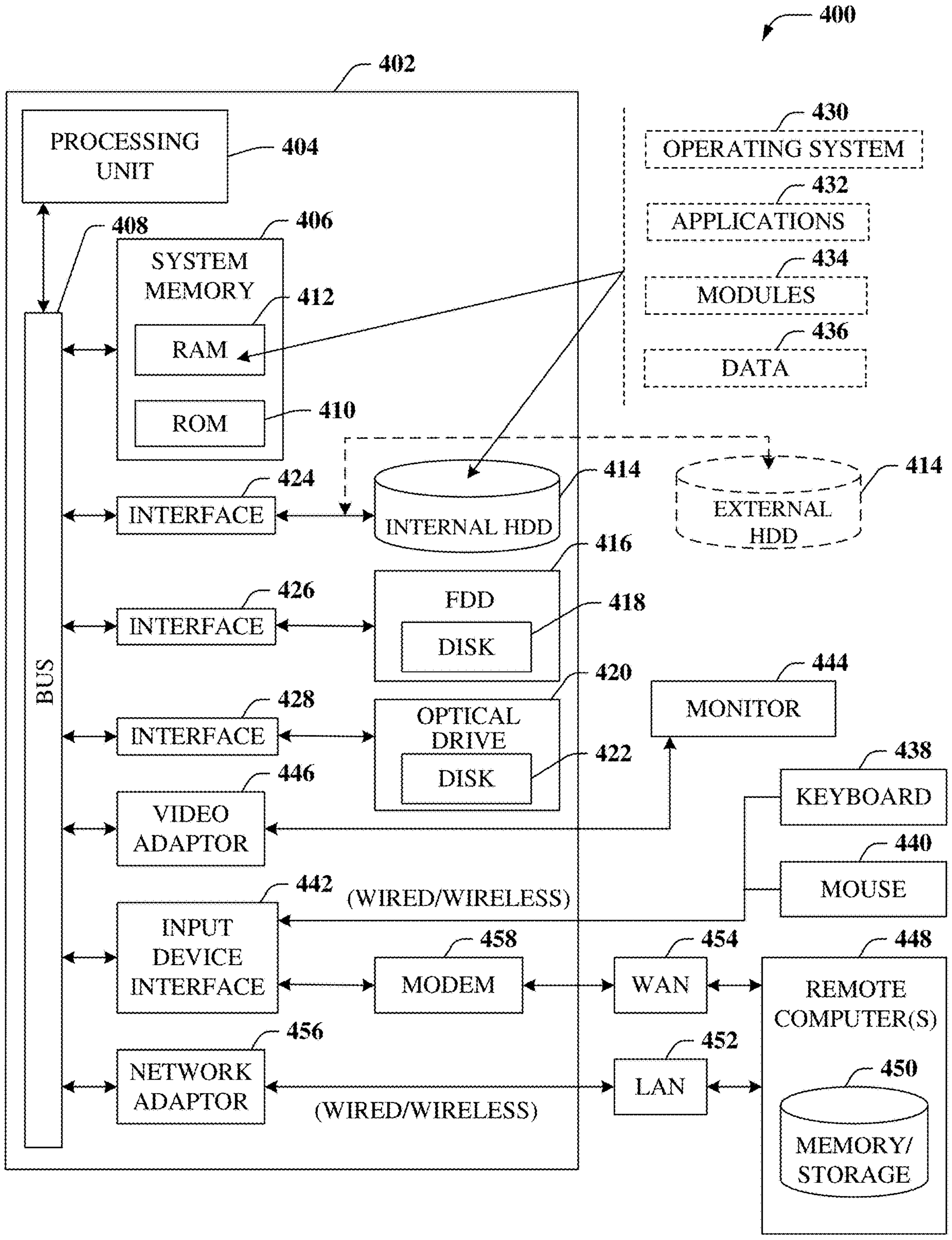
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

For example, computing environment 400 can facilitate in whole or in part generating network configuration data for a network device according to device information of a vendor; providing the network configuration data to an AI analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
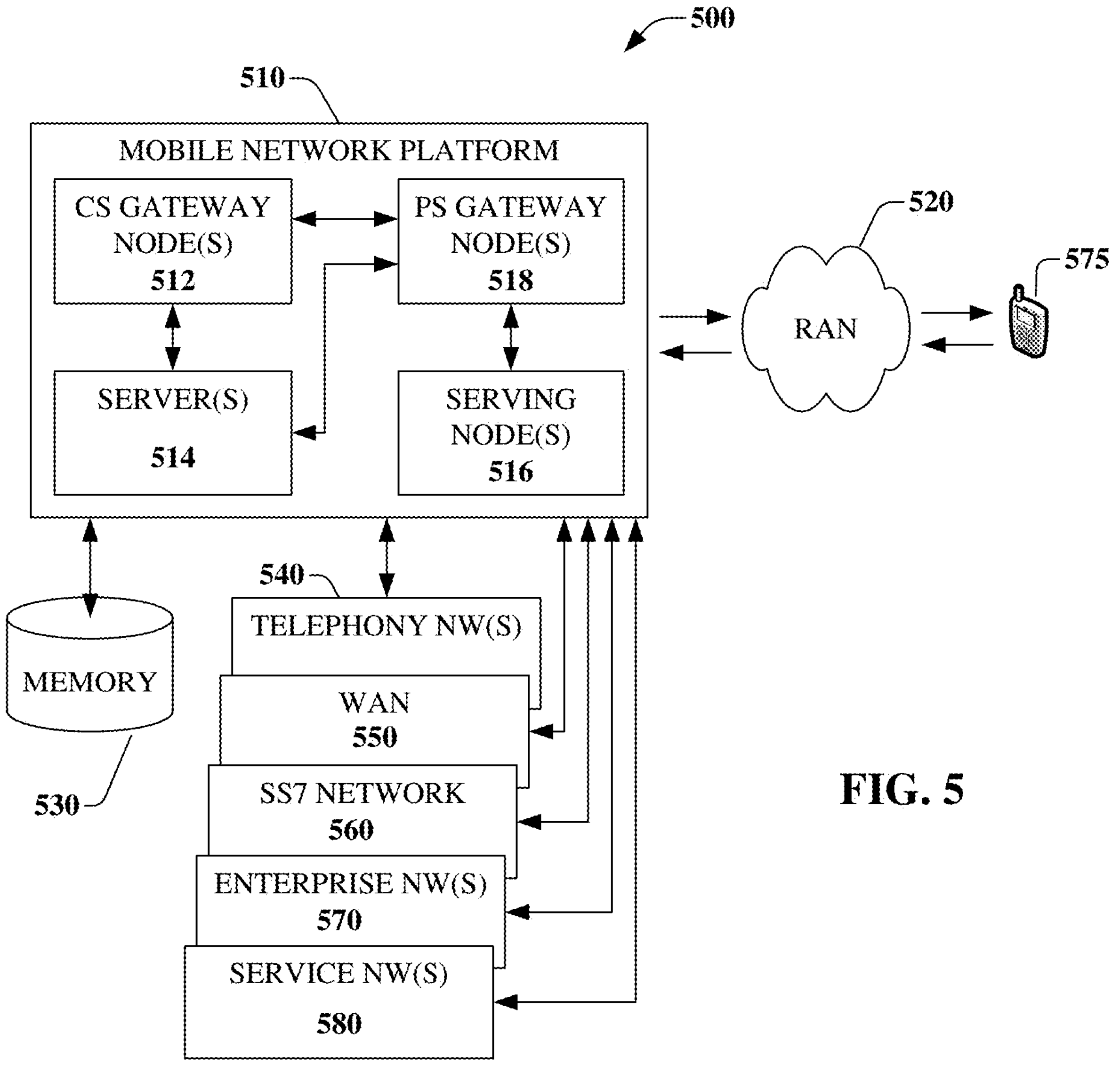
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating network configuration data for a network device according to device information of a vendor; providing the network configuration data to an AI analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
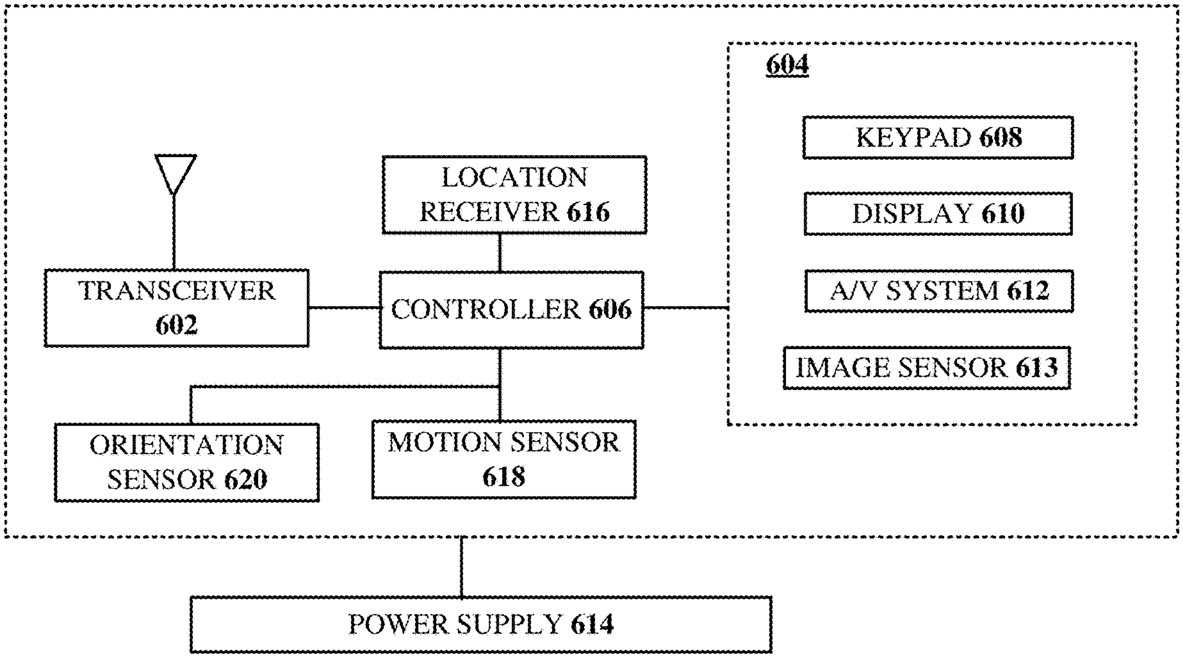
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generating network configuration data for a network device according to device information of a vendor; providing the network configuration data to an AI analysis platform that applies an AI model to the network configuration data based at least in part on topology data resulting in a configuration analysis, wherein the configuration analysis evaluates the network configuration data and generates at least one of rating information, adjustment information or a combination thereof. The rating information can include a security rating, a risk rating and/or an efficiency rating. The adjustment information can include a recommendation for changing at least a portion of the network configuration data for the network device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:

receiving, by a processing system including a processor, network configuration data for a network device from a Network Configuration Management (NCM) system;

receiving, by the processing system, topology data for a network in which the network device is or will be operating;

applying, by the processing system, an Artificial Intelligence (AI) model to the network configuration data based at least in part on the topology data resulting in a configuration analysis, wherein the configuration analysis evaluates a security rating, a risk rating, and an efficiency rating for the network configuration data;

providing, by the processing system, rating information according to the security rating, the risk rating, and the efficiency rating for the network configuration data;

receiving, by the processing system, partially adjusted network configuration data for the network device from the NCM system, wherein the partially adjusted network configuration data includes a portion of the network configuration data that has been adopted by the NCM system based on the rating information;

applying, by the processing system, the AI model to the partially adjusted network configuration data based at least in part on the topology data resulting in a partially adjusted configuration analysis, wherein the partially adjusted configuration analysis evaluates a partially adjusted security rating, a partially adjusted risk rating, a partially adjusted efficiency rating for the partially adjusted network configuration data; and providing, by the processing system, partially adjusted rating information according to the partially adjusted security rating, the partially adjusted risk rating, and the partially adjusted efficiency rating for the partially adjusted network configuration data.

2. The method of claim 1, wherein the AI model includes a Natural Language Processing (NLP) model, wherein the network configuration data is generated by the NCM system according to device information provided by equipment of a vendor associated with the network device and according to a network configuration template that is selected by the NCM system based on an identity of the vendor.

3. The method of claim 1, comprising:

providing, by the processing system, adjustment information according to the configuration analysis, wherein the adjustment information includes a recommendation for changing at least a portion of the network configuration data for the network device.

4. The method of claim 1, wherein the receiving of network configuration data comprises receiving encrypted network configuration data and decrypting the encrypted network configuration data to produce the network configuration data.

5. The method of claim 1, wherein the providing the rating information causes a display of the NCM system to present the security rating, the risk rating, and the efficiency rating for the network configuration data.

6. The method of claim 1, wherein the configuration analysis predicts network metrics for the network configuration data.

7. The method of claim 1, comprising:

receiving, by the processing system, second network configuration data for a second network device from the NCM system, wherein the applying of the AI model is based in part on a prediction as to how the second network configuration data of the second network device will effect the network device.

8. The method of claim 1, comprising:

receiving, by the processing system, historical data for the network, wherein the configuration analysis is based in part on the historical data, and wherein the historical data corresponds to network metrics measured for at least one of: the network device utilizing different network configuration data, a different network device utilizing the network configuration data, or a combination thereof.

9. A device, comprising:

a processing system including a processor; and a memory that stores executable instructions that, when executed by the processing system, facilitate performance of operations, the operations comprising:

providing network configuration data for a network device to an Artificial Intelligence (AI) analysis platform that applies an AI model to the network configuration data based at least in part on topology data resulting in a configuration analysis, wherein the configuration analysis evaluates a security rating, a risk rating, and an efficiency rating for the network configuration data;

receiving rating information according to the security rating, the risk rating, and the efficiency rating for the network configuration data;

adopting part of the network configuration data based on the rating information, thereby forming an adopted part of the network configuration data;

creating partially adjusted network configuration data, wherein the partially adjusted network configuration data includes the adopted part of the network configuration data and a modified version of an unadopted part of the network configuration data;

providing the partially adjusted network configuration data to the AI analysis platform that applies the AI model to the partially adjusted network configuration data based at least in part on the topology data resulting in a partially adjusted configuration analysis, wherein the partially adjusted configuration analysis evaluates a partially adjusted security rating, a partially adjusted risk rating, and a partially adjusted efficiency rating for the partially adjusted network configuration data; and receiving partially adjusted rating information according to the partially adjusted security rating, the partially adjusted risk rating, and the partially adjusted efficiency rating for the partially adjusted network configuration data.

10. The device of claim 9, wherein the operations comprise:

selecting a network configuration template based on an identity of a vendor of the network device; and generating the network configuration data according to device information provided by equipment of the vendor, wherein the AI model includes a Natural Language Processing (NLP) model.

11. The device of claim 9, wherein the operations further comprise:

receiving adjustment information from the AI platform according to the configuration analysis, wherein the adjustment information includes a recommendation for changing at least a portion of the network configuration data for the network device.

12. The device of claim 9, wherein the providing network configuration data comprises encrypting the network configuration data to produce encrypted network configuration data and providing the encrypted network configuration data.

13. The device of claim 9, wherein the operations further comprise:

providing telemetry data for the network device, configured according to final network configuration data based at least in part on the partially adjusted network configuration data, to the AI analysis platform.

14. The device of claim 9, wherein the operations comprise displaying the security rating, the risk rating, and the efficiency rating for the network configuration data.

15. The device of claim 9, wherein the configuration analysis predicts network metrics for the network configuration data.

16. The device of claim 9, wherein the configuration analysis is based in part on historical data accessed by the AI platform, and wherein the historical data corresponds to network metrics measured for at least one of: the network device utilizing different network configuration data, a different network device utilizing the network configuration data, or a combination thereof.

17. A non-transitory machine-readable medium, comprising executable instructions that, when executed by a processing system including a processor, facilitate performance of operations, the operations comprising:

generating first network configuration data for a first network device;

generating second network configuration data for a second network device;

providing the first network configuration data and the second network configuration data to an Artificial Intelligence (AI) analysis platform that applies an AI model to the first network configuration data based at least in part on topology data and the second network configuration data resulting in a configuration analysis, wherein the configuration analysis evaluates the first network configuration data and generates adjustment information that includes a recommendation for changing at least a portion of the first network configuration data for the first network device; and receiving the adjustment information from the AI platform.

18. The non-transitory machine-readable medium of claim 17, wherein the operations further comprise generating partially adjusted first network configuration data for the first network device, wherein the partially adjusted first network configuration data partially adopts the recommendation for changing the at least a portion of the first network configuration data for the first network device.

19. The non-transitory machine-readable medium of claim 18, wherein the operations further comprise providing the partially adjusted first network configuration data to the AI platform causing applying of the AI model to the partially adjusted first network configuration data based at least in part on the topology data resulting in a second configuration analysis, wherein the second configuration analysis evaluates a security rating, a risk rating, and an efficiency rating for the partially adjusted first network configuration data; and receiving partially adjusted rating information from the AI platform according to the security rating, the risk rating, and the efficiency rating for the partially adjusted first network configuration data.

20. The non-transitory machine-readable medium of claim 17, wherein the configuration analysis results in a security rating, a risk rating, and an efficiency rating for the first network configuration data of the first network device.

* * * * *